(12) United States Patent
Divljakovic et al.

(10) Patent No.: US 6,699,081 B1
(45) Date of Patent: Mar. 2, 2004

(54) MARINE PROPULSION DEVICE WITH A SWITCHED RELUCTANCE STARTER MOTOR AND GENERATOR SYSTEM

(75) Inventors: Vojislav V. Divljakovic, Chicago, IL (US); David L. Neumann, Plymouth, WI (US); Richard L. Sleder, Sr., Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/345,678

(22) Filed: Jan. 16, 2003

(51) Int. Cl.[7] ............................................... B63H 21/22
(52) U.S. Cl. ................................ 440/1; 440/84; 440/85
(58) Field of Search ........................ 123/406.57; 440/1, 440/84, 85, 87

(56) References Cited

U.S. PATENT DOCUMENTS

| | | | |
|---|---|---|---|
| 4,244,336 A | * 1/1981 | Fitzner | 123/406.57 |
| 4,345,553 A | * 8/1982 | Magrane et al. | 123/406.57 |
| 5,012,172 A | 4/1991 | Sember | 318/696 |
| 5,012,177 A | 4/1991 | Dhyanchand et al. | 322/10 |
| 5,075,610 A | 12/1991 | Harris | 318/701 |
| 5,373,206 A | 12/1994 | Lim | 310/68 |
| 5,446,359 A | 8/1995 | Horst | 318/701 |
| 5,523,635 A | 6/1996 | Ferreira et al. | 310/71 |
| 5,654,601 A | 8/1997 | Fulton | 310/168 |
| 5,736,828 A | 4/1998 | Turner et al. | 318/701 |
| 5,864,477 A | 1/1999 | Webster | 363/132 |
| 6,255,756 B1 | 7/2001 | Richter | 310/208 |
| 6,351,094 B1 | 2/2002 | Green | 318/701 |
| 6,357,401 B1 * | 3/2002 | Moriyama et al. | 123/54.4 |
| 6,570,281 B2 * | 5/2003 | Kashima et al. | 310/74 |
| 6,579,137 B2 * | 6/2003 | Mabru | 440/113 |

* cited by examiner

Primary Examiner—Stephen Avila
(74) Attorney, Agent, or Firm—William D. Lanyi (57) ABSTRACT

A switch reluctance device is used as a starter/generator for an outboard motor. The rotor of the switch reluctance device is attached to the crankshaft of the internal combustion engine and serves as a flywheel for the engine. The switch reluctance device is operated in a motoring mode when it is used as a starter motor for the internal combustion engine. The switch reluctance device is operated in an electrical power generating mode when the internal combustion engine is operating above a predetermined operating speed.

20 Claims, 6 Drawing Sheets

MARINE PROPULSION DEVICE WITH A SWITCHED RELUCTANCE STARTER MOTOR AND GENERATOR SYSTEM

BACKGROUND OF THE INVENTION

1. Field of the Invention

The present invention is generally related to a switched reluctance or variable reluctance machine used both as a starter motor and a generator and, more particularly, to the use of a switched reluctance starter motor and generator system in conjunction with a marine propulsion device, such as an outboard motor.

2. Description of the Prior Art

Switched reluctance machines have been known to those skilled in the art for many years. These machines can be used either as an electric motor or as an electric generator.

U.S. Pat. No. 5,864,477, which issued to Webster on Jan. 26, 1999, describes a converter circuit for a polyphase switched inductive load. A converter circuit for an inductive load, such as the phase windings of a switched reluctance motor, uses only n-switches for n-phases. In a four phase machine, each of the three of the phases is serially connected with a switch across one voltage source. The remaining phase is serially connected with a switch across another voltage source which receives the inductive energy returned by the other three phases. This returned energy is used to energize the fourth phase. A generator converter is also disclosed in which the energy in the fourth phase is used to provide the excitation for the other three phases.

U.S. Pat. No. 5,075,610, which issued to Harris on Dec. 24, 1991, describes a switched reluctance motor control circuit with energy recovery capability. A control circuit for a switched reluctance motor is provided with a connection between a second end of each stator winding and a first end of an associated other winding. The purpose of this connection is to permit the flow of current from a phase winding to an energy storage device following the disconnection of the phase winding from a primary power source. Because of the inductive characteristics of the phase winding in a switched reluctance motor, the current flow through the winding does not immediately cease when the winding is disconnected from the power source. Instead, the inductive characteristic resists the immediate cessation of current flow following the opening of an associated switch. That continued current flow is directed to an energy storage device, such as a capacitor, for the purpose of raising the voltage at the first, or input, end of another stator winding. This increased voltage potential at the first end of the other stator winding assists the initiation of current flow through that stator winding when its switch is later closed for the purpose of energizing the winding. Alternative embodiments of the invention include the directing of the continued current flow to more than one other winding to permit bi-directional rotation of the motor rotor.

U.S. Pat. No. 5,736,828, which issued to Turner et al on Apr. 7, 1998, describes an electric machine controller. The controller for a switch reluctance machine, especially a switch reluctance motor, takes timing information from a rotor position transducer to generate a switch-off output at a point near maximum phase inductance in a phase inductance cycle. A switch-on signal is generated after a delay but still within the phase inductance cycle. A simple form of single pulse control is thereby achieved. A comparator is also provided which monitors phase winding current. A pulse generator is actuated by the comparator when the winding current exceeds a reference level and is used to control the motor in a chopping mode at low speeds and is disabled by the comparator at higher speeds when the single-pulse control is used.

U.S. Pat. No. 5,446,359, which issued to Horst on Aug. 29, 1995, describes a current decay control in a switched reluctance motor. A control circuit for controlling the residual or tail current decay in a single phase or polyphase switched reluctance motor winding when a phase is switched from active to inactive is described. A Hall-effect type sensor senses rotor position of the switched reluctance motor. Current flows through a winding of the motor when the motor phase winding is active; and, current flow into the windings decays to zero when the phase becomes inactive. Semiconductor switches direct current flow into the winding when the phase is active and then redirect residual energy into winding between an energy recovery circuit and an energy dissipation circuit when the phase becomes inactive. A pulse width modulated signal generator provides pulse width modulated operating signals to the switches to control current flow first into the winding and then between the recovery and dissipation circuits. A control module or microprocessor with a pulse width modulated output is responsive to rotor position information for controlling operation of the pulse width modulated signal generator. The signal generator provides pulse width modulated signals having one set of signal characteristics when there is current flow to the winding and a different set of characteristics when there is not. This produces alternative intervals of zero voltage and forced commutation residual current decay while the phase is inactive. During the decay interval, both pulse width modulated frequency and the pulse duty cycle are variable to produce a current decay scheme which eliminates ringing and motor noise.

U.S. Pat. No. 5,373,206, which issued to Lim on Dec. 13, 1994, describes a position detection of rotors for switched reluctance motors. A position detection apparatus for a switched reluctance motor is disclosed wherein a single sensor is used for detecting a rotor position and thus driving the motor. A sensing unit is provided with a single sensor for detecting a position of a rotor, a start signal generation circuit, for generating a start signal for aligning the rotor with a stator upon starting, a position detection signal input circuit for passing the position detection signal following the start signal, a drive control pulse generation circuit, for receiving an output signal from the position detection signal input signal as a clock signal, sequentially shifting driving signals for respective phases and generating drive control pulses for respective phases, and a phase excitation circuit for logically combining phase drive control pulses from the drive control pulse generator with the start signal from the start, signal generation circuit and exciting the phases sequentially.

U.S. Pat. No. 5,012,177, which issued to Dhyanchand et al on Apr. 30, 1991, describes a power conversion system using a switched reluctance motor/generator. Prior power conversion systems operable in generating and starting modes have utilized brushless generators which are suitable for only certain applications. In order to overcome this problem, a power conversion system operable in generating and starting modes utilizes a switched reluctance motor/generator which is reliable and inexpensive and which can be used in a variety of environments.

U.S. Pat. No. 5,012,172, which issued to Sember on Apr. 30, 1991, describes a control system for a switched reluctance motor operating as a power generator. A method for operating a multi-phase switched reluctance motor in a generator mode includes gating switches connected in series with selected ones of the phase windings of the motor into conduction to establish current flow in a selected one of the windings. The switches are thereafter disabled and current is forced to commutate into flyback diodes whereby the current is returned to an associated DC bus. The instant at which the conducting switches are gated out of conduction is selected or measured in angular displacement between an associated stator pole and a corresponding rotor pole by establishing a preselected magnitude of current such that when the current in the winding reaches that magnitude, the switches are disabled. The voltage at the DC bus is regulated during generator mode operation by adjusting the phase angle measured between a stator pole and a corresponding rotor pole at which the switches are gated into conduction. The voltage is alternatively regulated at the DC bus by adjusting the phase angle at which the switches are disabled if the generated current does not reach the preselected magnitude. Overcurrent protection is included to reduce the turn-on angle if the current in the DC bus exceeds another preselected magnitude.

U.S. Pat. No. 6,351,094, which issued to Green on Feb. 26, 2002, describes the control of switched reluctance machines. A switched reluctance drive include a reluctance machine, a controller, power switches actuated by the controller and a current transducer for monitoring the current in each phase winding. The controller employs a sensorless rotor position detection technique by injecting voltage pulses into the idle period of each phase winding in a chopping mode. Acoustic noise associated with the injected pulses is concealed by varying the frequency at which the pulses are injected according to rotor speed. In an alternative embodiment the frequency is varied pseudo-randomly.

U.S. Pat. No. 6,255,756 which issued to Richter on Jul. 3, 2001, describes a winding arrangement for a switched reluctance machine based internal starter generator. A stator coil winding arrangement comprises an inner layer and an outer layer, which define the two layers of the coil. A first turn of the inner layer is positioned directly over the outer layer. All subsequent turns of the inner layer return to the inner layer to be positioned over the inner layer. With this winding arrangement, total losses in the stator coil are reduced by approximately a factor of two.

U.S. Pat. No. 5,654,601, which issued to Fulton on Aug. 5, 1997, describes a switched reluctance machine. The machine comprises a rotor, defining rotor poles and a stator defining stator poles. Each stator pole pair, creating a flux path through the rotor includes only one winding mounted on one of the stator poles. The invention is particularly applicable to a machine having a four-pole field pattern and an odd number of phases. The coils are placed on alternate stator poles such that the space between the stator poles can be used exclusively for a single winding. The single winding is made larger to compensate for the lack of a winding on its associated pole.

U.S. Pat. No. 5,523,635, which issued to Ferreira et al on Jun. 4, 1996, describes a switched reluctance starter/generator. A switch reluctance starter/generator is presented which has a stator mounted within a housing having an outer periphery and a plurality of salient poles defining an inner periphery, the salient poles further defining slots therebetween. A stator cooling sleeve is press fit on the outer periphery of the stator and defines a plurality of cooling channels between the outer periphery of the stator cooling sleeve and the housing. A plurality of phase windings are wound on the plurality of salient stator poles, and phase winding retainers are positioned within the slots for securing the phase windings on the salient stator poles. The winding retainers comprise a triangular base separator, a quasi-dovetailed retaining member, and two opposing wedge shaped expanders. A rotor assembly is rotatably positioned within the stator, and comprises a hollow shaft assembly and a rotor core having a plurality of salient poles press fit on the outer periphery of the shaft. The hollow shaft assembly comprises an outer sleeve and an inner cooling sleeve. The inner periphery of the inner cooling sleeve defines an interior void of the shaft. The outer periphery of the inner cooling sleeve is press fit on the inner periphery of the outer sleeve and defines a plurality of cooling channels between the inner periphery of the outer sleeve and the outer periphery of the inner cooling sleeve. The stator windings are wound from hollow core conductors, and are coupled to external sources of cooling fluid and electrical energy by electrical/hydraulic terminal connectors.

The patents described above are hereby expressly incorporated by reference in the description of the present invention.

Switched reluctance machines comprise a stator, with a number of stator poles, and a rotor, with a number of rotor poles. The number of stator poles does not equal the number of rotor poles. The stator poles are provided with a number of stator windings through which current can be induced to flow. When operating as a motor, the stator windings are energized at appropriate times to attract adjacent rotor poles toward them to produce torque. A switching control system then switches off the current flow in certain stator poles as the rotor poles approach them, in coordination with the energization of other stator poles to further attract rotor poles. When operating as a generator, the rotor is mechanically driven by some power source, such as an internal combustion engine, and the stator poles are energized to produce a magnetic field. As the rotor poles move into the proximity of the magnetic field, various switches are activated to cause the resulting generated current in the stator coils to flow in a preselected direction for the purpose of charging an electrical energy storage device, such as a battery. Switched reluctance machines have been used as both motors and generators and the control of such machines for these purposes is well known to those skilled in the art.

SUMMARY OF THE INVENTION

A marine propulsion device, made in accordance with the preferred embodiment of the present invention, comprises an internal combustion engine and a crankshaft supported within the internal combustion engine for rotation about a generally vertical axis. It also comprises a switched reluctance device comprising a rotor and a stator, wherein the rotor is attached in torque transmitting relation with the crankshaft and is rotatable relative to the stator. A stator winding structure is associated with the stator and a source of electrical power is provided. The source of electrical power is alternatively connectable in electrical communication with the stator winding in accordance with a motoring mode of operation and an electrical power generating mode of operation. The marine propulsion device further comprises a switching circuit that is connected in signal communication with the stator winding and the source of electrical power for connecting and disconnecting the stator winding and the source of electrical power in coordination with rotation of the crankshaft about the generally vertical axis. The present invention also comprises a controller that is connected in signal communication with the switching circuit and configured to select the motoring mode of operation when the internal combustion engine is being started and to select the electrical power generating mode of operation when the internal combustion engine is operating above a preselected operating speed.

A preferred embodiment of the present invention further comprises a position sensor connected in signal communication with the switching circuit for determining the rotational position of the rotor. The rotor can be attached directly to the crankshaft for rotation about the generally vertical axis. The rotor can be disposed radially inwardly from the stator or radially outwardly from the stator. The source of electrical power can be a 36 volt battery system for providing DC current to the switched reluctance device. It can also be a 12 VDC or 24 VDC supply. In one particular embodiment of the present invention, the stator has 18 poles and the rotor has 12 poles. The rotor operates as a flywheel of the internal combustion engine. The switching circuit can comprise a plurality of metal oxide semiconductor field effect transistors (MOSFET's).

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figures 1, 2, 3:
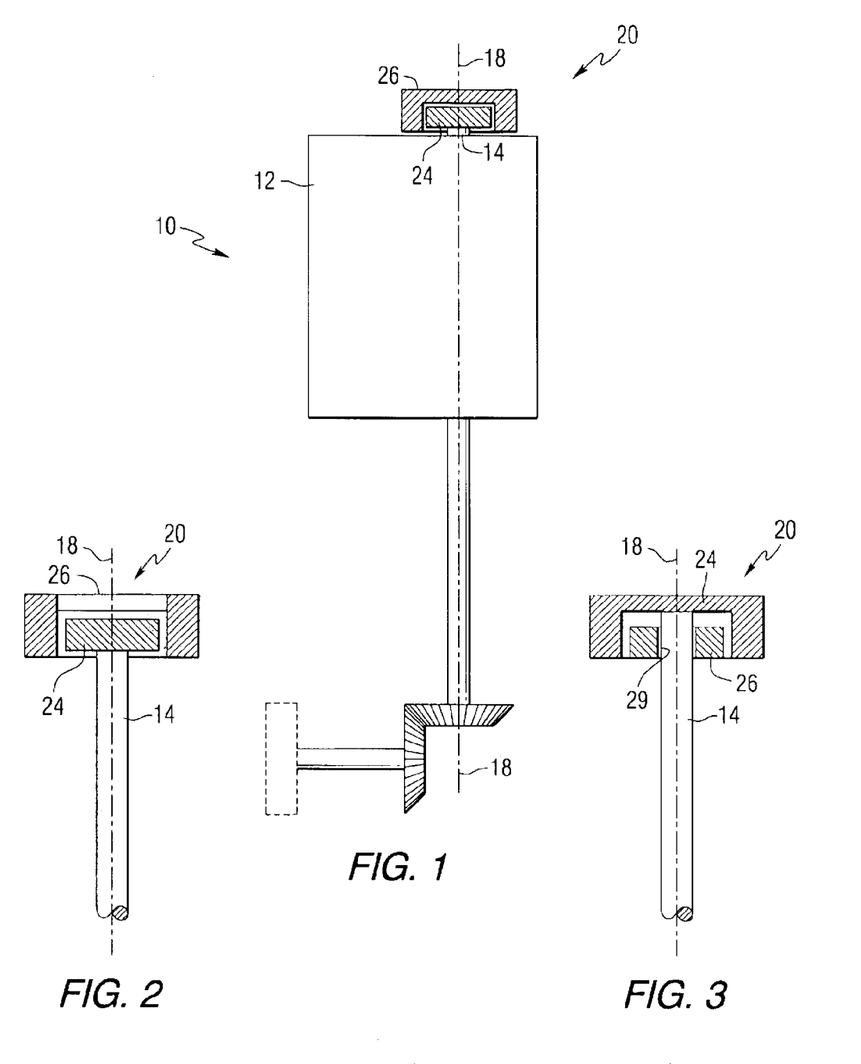
FIG. 1 is a simplified representation of an internal combustion engine of an outboard motor with a switched reluctance device attached to its crankshaft.
FIGS. 2 and 3 show two alternative configurations of the rotor and stator of the switch reluctance device.

FIG. 1 is a highly simplified representation of an outboard motor 10 which comprises an internal combustion engine 12 and a crankshaft 14 which is supported within the internal combustion engine 12 for rotation about a generally vertical axis 18. A switched reluctance device 20 comprises a rotor 24 and a stator 26. The rotor 24 is attached in torque transmitting relation with the crankshaft 14. The rotor 24 is rotatable relative to the stator 26.

As will be described in greater detail below, a stator winding structure is associated with the poles of the stator 26. Also, a source of electrical power, such as a battery, is provided and is alternatively connectable in electrical communication with the stator winding in accordance with either a motoring mode of operation or an electrical power generating mode of operation. A switching circuit is connected in electrical communication with the stator winding and with the source of electrical power for connecting and disconnecting the stator winding and the source of electrical power in coordination with the rotation of the crankshaft 14 about the generally vertical axis 18. A controller is connected in signal communication with the switching circuit and configured to select the motoring mode of operation when the internal combustion engine 12 is being started and to select the electrical power generating mode of operation when the internal combustion engine 12 is operating above a preselected operating speed. A position sensor is connected in signal communication with a switching circuit and an engine control module for determining the rotational position of the rotor 24. The rotor 24 can be attached directly to the crankshaft 14, as shown in FIG. 1, and can be rotatable about the generally vertical axis 18 to provide position information regarding both the rotor and the crankshaft.

FIGS. 2 and 3 show two alternative embodiments of the switched reluctance device 20. In FIG. 2, the rotor 24 is disposed radially inwardly from the stator 26. The rotor 24 is attached directly to the crankshaft 14 for rotation about the generally vertical axis 18. In FIG. 3, the rotor 24 is disposed radially outwardly from the stator 26. The rotor 24 in FIG. 3 is attached directly to the crankshaft 14 for rotation about the generally vertical axis 18. The crankshaft 14, in FIG. 3, extends through a central opening 29 formed in the stator 26 to allow the crankshaft 14 to be attached to the rotor 24. Both of the alternative embodiments shown in FIGS. 2 and 3 can be used in conjunction with the present invention.

Figure 4:
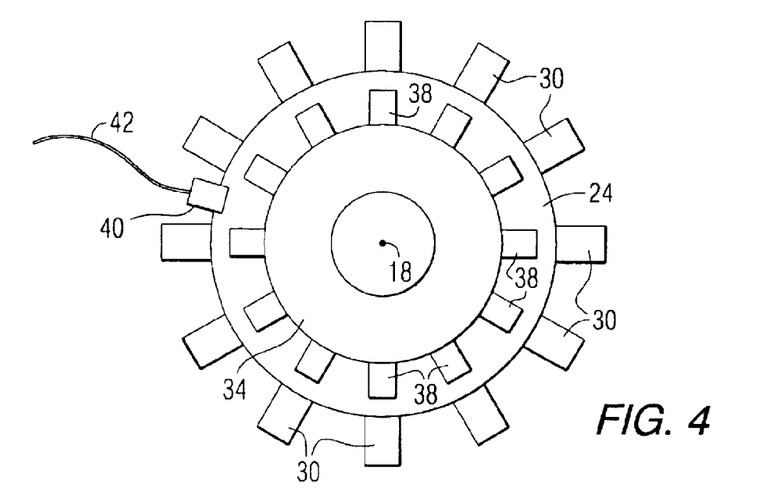
FIG. 4 shows a rotor of a switch reluctance device in combination with a timing wheel that has a plurality of teeth which are sensed by a rotational position sensor.

FIG. 4 shows the rotor 24 with a plurality of rotor teeth 30 extending radially outwardly from the rotor. A target wheel 34 is attached to the rotor 24. The target wheel 34 is provided with a plurality of teeth 38. The purpose of the target wheel 34 is to allow a sensor, such as a Hall effect sensor 40, to determine the rotational position of the rotor 24. The rotational positional sensor 40 is illustrated in FIG. 4 at a preselected position that remains fixed. As the target wheel 34 rotates about the generally vertical axis 18, the teeth 38 of the target wheel 34 provides signals that are transmitted, on line 42, to a microprocessor or switching circuit hardware that energizes the stator winding structure of the switch reluctance device in coordination with the rotation of the rotor. In FIG. 4, the rotor 24 has 12 teeth 30 and the target wheel 34 has 12 teeth 38, but may have more if the application requires it.

Figure 5:
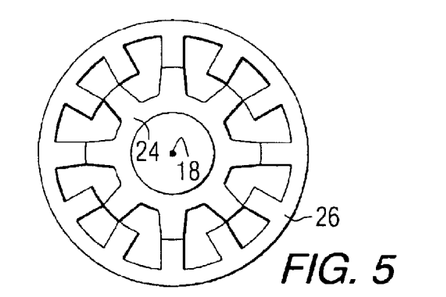
FIGS. 5–7 show three possible combinations of stators and rotors for a switch reluctance device.
Figure 6:
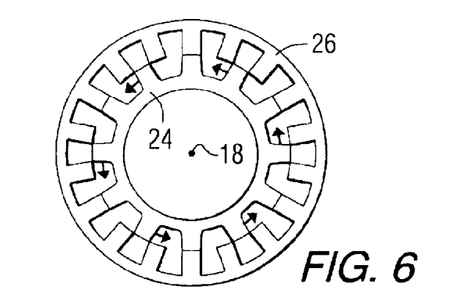
Figure 7:
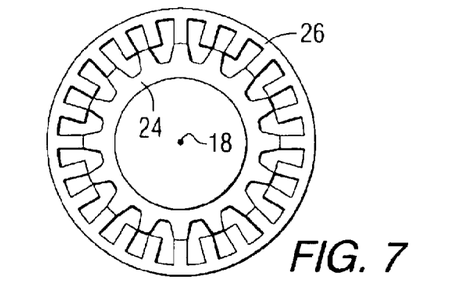

FIGS. 5–7 show alternative configurations of rotors 24 and stators 26. In FIG. 5, the stator 26 has 12 poles and the rotor 24 as 8 poles. In FIG. 6, the stator 26 has 18 poles and the rotor 24 has 12 poles. In FIG. 7, the stator 26 has 24 poles and the rotor 24 has 16 poles. Although the rotor and stator of the dynamoelectric device can be made in accordance with many alternative embodiments that utilize different numbers of rotor and stator poles, a preferred embodiment of the present invention has been configured in accordance with the illustration shown in FIG. 6, with 18 stator poles and 12 rotor poles. In FIGS. 5–7, the stator windings are not illustrated.

Figure 8:
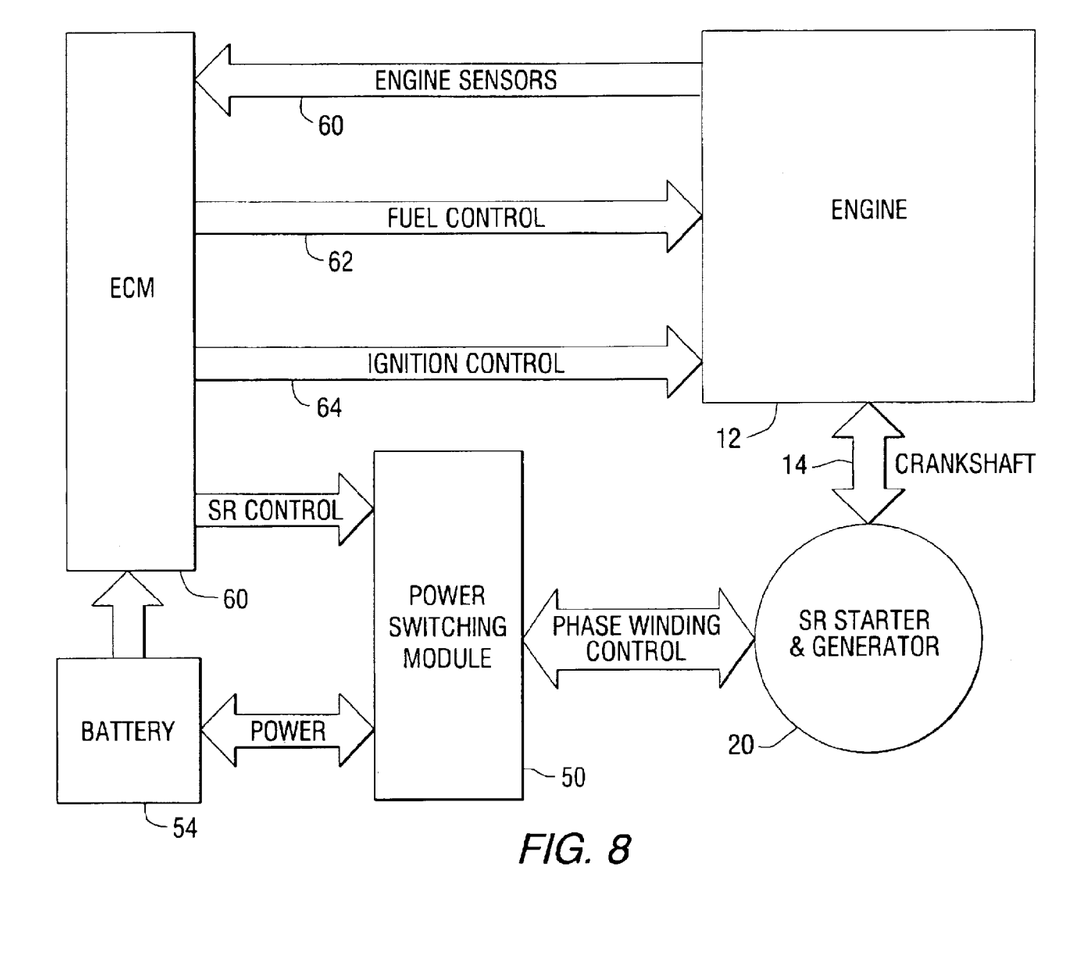
FIG. 8 is a simplified schematic representation of a system incorporating the present invention.

FIG. 8 is a schematic representation of a system configured in accordance with the present invention. The engine 12 is represented in FIG. 8 along with its crankshaft 14 and the switch reluctance device 20, which is intended to operate as both a starter motor and a generator of electrical power. A switching circuit 50 is connected in signal communication with the stator winding and with the source of power 54 that comprises a battery system. The switching circuit 50 comprises a power switching module that selectively connects and disconnects the various stator windings of the switched reluctance device 20 in electrical communication with the source of electrical power 54 as the rotor rotates relative to the stator. An engine control module 60 is connected in signal communication with the switching circuit 50 and with various elements of the engine 12. Numerous engine sensors 60 provide information to the engine control module relating to the operation of the engine. In turn, the engine control module 60 controls the fuel flow to the engine 12 as represented by arrow 62, and the ignition system of the engine 12 as represented by arrow 64. The engine control module receives its power from the battery which serves as the source of electrical power 54.

Figure 9:
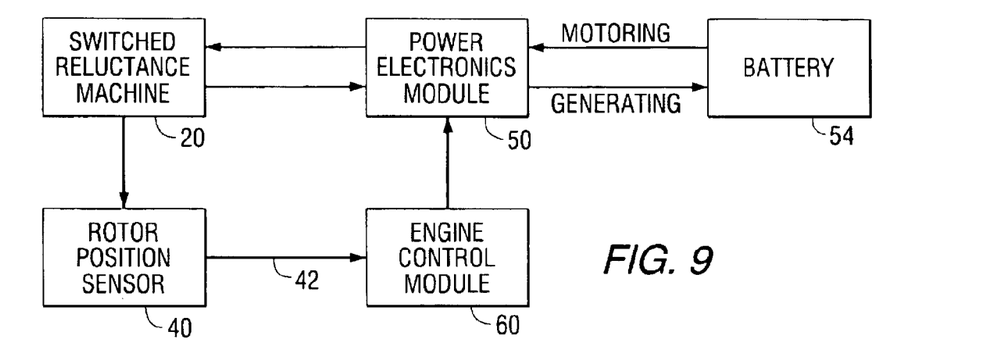
FIG. 9 is simplified schematic representation showing the inner relationships of various elements of the present invention.

FIG. 9 is a schematic representation of the present invention, showing the major elements and their relationships to each other. The switched reluctance device 20 is associated with the crankshaft of the engine and a rotor position sensor 40 provides signals to an engine control module 60 relating to the precise angular position of the rotor 24 and its teeth 30 as it rotates about the generally vertical axis 18. The engine control module 60 provides signals to the switching circuit 50. The switching circuit 50 connects and disconnects the stator winding and the source of electrical power 54 in coordination with the rotation of the crankshaft, as sensed by the rotor position sensor 40. The switch reluctance device 50 can operate in either a motoring mode of operation or an electric power generating mode of operation. When operating in the motoring mode, such as when the internal combustion engine is being started, the source of electrical power 54 provides an electrical current to the stator winding structure of the switch reluctance device 20, through the switching circuit 50. When operating in the electrical power generating mode, the switch reluctance device 20 provides electrical power to the source of electrical power, such as the battery 54, through the switching circuit 50.

Figure 10:
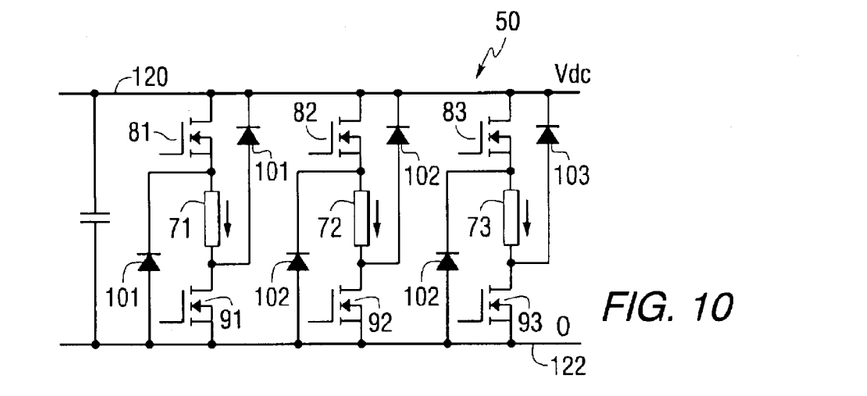
FIG. 10 shows the switching circuit of the present invention.
Figure 11:
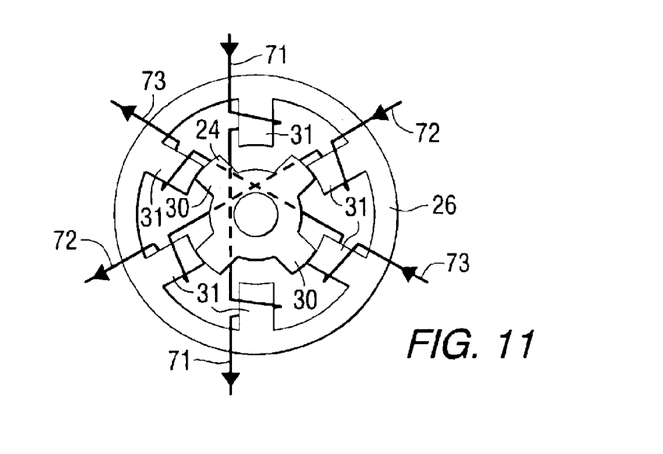
FIG. 11 shows a schematically represented stator winding associated with a pole pair of a switch reluctance device.

FIG. 10 shows an electrical schematic diagram of a switching circuit 50 and FIG. 11 is a simplified representation of a rotor 24 and a stator 26, with an exemplary stator winding 71 shown in association with one pair of stator poles 31. The switching circuit 50 is shown with the three stator windings, 71–73, connected between a battery voltage bus 120 and electrical ground 122. A first stator winding 71 is associated with two metal oxide semiconductor field effect transistors (MOSFET's), 81 and 91. The second stator winding 72 is associated with MOSFET's 82 and 92 and the third stator winding 73 is associated with MOSFET's 83 and 93. A pair of diodes 101 is associated with the first stator winding 71, a pair of diodes 102 is associated with the second stator winding 72, and a pair of diodes 103 is associated with the third stator winding 73. Each of the three stator windings is intermittently subjected to the flow of current through them in a constant direction. For purposes of this discussion, that direction of current flow is represented by arrows proximate the stator windings in FIG. 10. By appropriate switching of the MOSFET's and the positioning of the diode pairs, 101–103, the current flowing through the stator windings, 71 and 73, can be directed to either the battery voltage bus 120 or to the electrical ground 122.

With continued reference to FIGS. 10 and 11, current flowing through the first stator winding 71, as illustrated by the associated arrow in FIG. 10, will flow in a direction from the battery voltage bus 120 to the electrical ground 122 when the MOSFET's, 81 and 91, are energized. However, if the MOSFET's, 81 and 91, area not conducting, the current flowing through the stator winding 71 flows through the pair of diodes 101 in a direction from ground potential 122 toward the battery supply bus 120. When the MOSFET's are turned off, the polarity of the winding 71 reverses and the winding then provides current to the battery through the diodes as a result of the energy stored in the field inductance of the stator winding. When current is flowing from the battery supply bus 120 to ground potential 122, through the stator winding 71, the switched reluctance device operates as a motor by converting electrical power provided by the source of electrical power 54 into mechanical energy represented by rotation of the rotor 24. When the MOSFET's, 81 and 91, are not in a conducting mode, and current is flowing from ground potential 122 to the battery supply bus 120, the switched reluctance device is operating as an electrical power generator. In other words, when current flows through the pair of diodes 101, the battery is being charged and when current is flowing through the MOSFET's, 81 and 92, battery power is used to cause rotation of the rotor 24.

With continued reference to FIGS. 9–11, it should be understood that different examples of the precise timing of the energization and de-energization of the MOSFET's can be selected to achieve predetermined goals. Many different types of control schemes are well known to those skilled in the art. This is true whether the switched reluctance device 20 is used as a starter motor or as an electrical power generator. Although the basic timing of the MOSFET switching must be compatible with the positions of the rotor poles in relation to the positions of the stator poles, the precise techniques used to maximlize a predetermined goal can result in many different variations of the switching timing.

It should be understood that the description regarding stator winding 71 in FIG. 10 applies to the other two stator windings, 72 and 73, and their related MOSFET's and diodes. However, it should also be understood that MOSFET's associated with the three windings, 71–73, are sequentially energized by the switching circuit 50 in coordination with the rotation of the rotor 24 and the relative positions of the rotor poles 30 to the stator poles 31 around which each of the stator windings is wound. This timing sequence strategy causes the rotor 24 to rotate when the switched reluctance device 20 is operating in the motoring mode of operation, in the clockwise direction in the example shown in FIG. 11, and causes the electrical power to be generated when the switched reluctance device 20 is operating in the electrical power generating mode.

Figure 12:
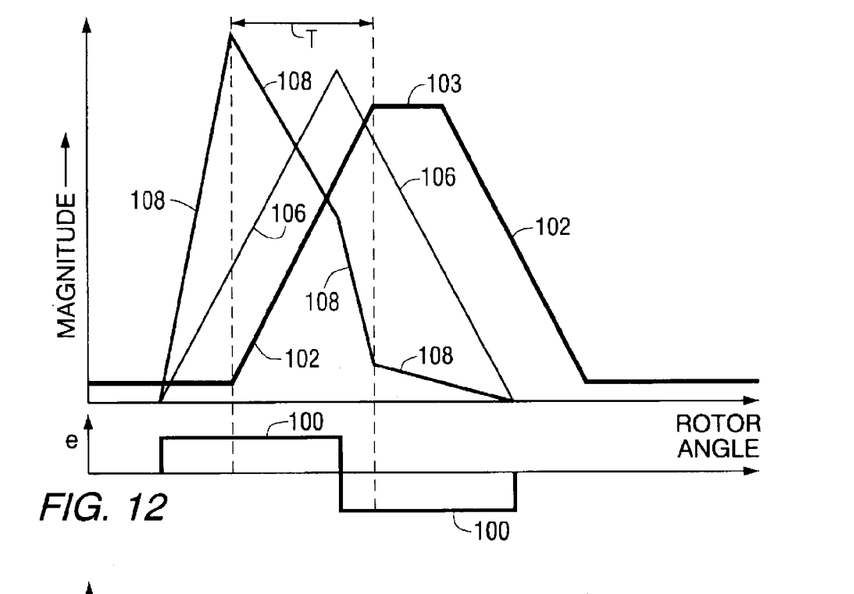
FIG. 12 graphically represents the changes of various electrical characteristics as a function of rotor angle when the switch reluctance device is used as a starter motor.
Figure 13:
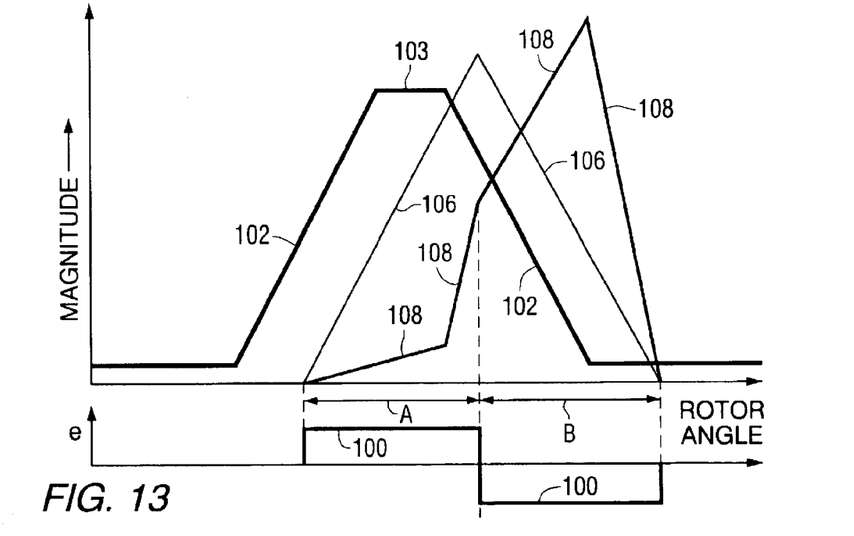
FIG. 13 shows the electrical characteristics of FIG. 12 when the switch reluctance device is used as an electrical generator.

Those skilled in the art of switched reluctance devices are aware that these devices can be used as a motor or as an electrical generator. FIG. 12 represents the exemplary magnitudes of various electrical characteristics, graphically presented as a function of rotor angle, when the switched reluctance device is operated in a motoring mode. FIG. 13 represents various exemplary electrical characteristics, plotted as a function of rotor angle, when the switched reluctance device is operating in the electrical power generating mode. It should be understood that both FIGS. 12 and 13 illustrate the changing parameters for a single stator winding, but each of the three stator windings behaves similarly according to the operation of the MOSFET's associated with that stator winding and the position of the rotor poles 30 relative to the stator poles 31 with which the stator winding in question is associated.

In FIG. 12, line 100 represents the connection status of the MOSFET's associated with the stator winding. When the line 100 is above the horizontal axis, the MOSFET's are energized and electrical current is conducted from the source of electrical power 120, as shown in FIG. 10, to the ground potential 122. When line 100 is below the horizontal axis in FIG. 12, the associated MOSFET's are de-energized and current is conducted from the point of ground potential 122 to the bus 120 of the source of electric power, with one end of the stator winding providing current through one of the diodes 101 to the bus 120 and the other end of the stator winding receiving current through the other diode 101 from the ground bus 122, which in a preferred embodiment is a battery. Line 102 represents the change in inductance (L) of the stator winding as the most proximate rotor pole 30 moves past it. The generally horizontal portion 103 of the inductance line 102 represents the alignment of a rotor pole 30 with the stator pole 31 around which the stator winding is wound. In FIG. 12, line 106 represents the integral of the voltage 100, measured over time. In other words, the magnitude of line 106 is equivalent to the accumulated area under curve 100 with respect to the horizontal axis. Line 108 represents the current (i) which is determined by dividing the magnitude of line 106 by the inductance magnitude represented by line 102. The torque T produced by the switched reluctance device when operated as a motor, is produced between the vertical dashed lines in FIG. 12, as represented by arrow T. The relationships represented graphically in FIG. 12 are also represented by equations 1–3 which will be described below.

FIG. 13 is a graphical representation of the parameters described above in conjunction with FIG. 12, but during the electrical power generating mode of operation of the switched reluctance device. As described above, the generally horizontal portion 103 of the inductance curve 102 represents the time when the most proximate rotor pole 30 is aligned with the stator pole 31 around which the stator winding in question is wound. The area under line 108, coincident with the energization period of the MOSFET's, when the voltage across the winding 71 is positive with respect to the horizontal axis in FIG. 13, represents the power that is put into the switch reluctance device by the battery. The period over which this area under line 108 represents power input is represented by arrow A in FIG. 13. When the MOSFET's are de-energized, the electrical current flowing through the stator winding 71 is directed from the point of ground potential 122 in FIG. 10 to the supply bus 120. This creates a charging function that directs electrical current to flow to the battery. As a result, the area under line 108 in FIG. 13, during the period represented by arrow B, represents power output obtained from the switched reluctance device.

With continued reference to FIGS. 12 and 13, the relative magnitudes of the electrical characteristics shown in FIG. 12 are applicable during the time when the switched reluctance device is used as a motor to start an internal combustion engine. The electrical characteristics represented in FIG. 13, on the other hand, are relevant to the time when the switched reluctance device is used as an electrical generator to recharge the batteries.

As is known to those skilled in the art of switched reluctance devices, an energy equation can be provided to describe the operation of the device. In its most basic form, the energy equation states that energy input from an electrical source (e.g. a battery) is equal to the sum of the mechanical energy output of the device, the increase in energy stored in the coupling field, and the energy converted to heat. When the device is used as a starter motor, the energy input from the electrical source is equal to the increase in energy stored in the coupling field plus the mechanical energy output. This is represented in equation 1 below. Equation 2 is a more specific restatement of equation 1 and equation 3 defines torque in terms of current and the change in inductance as a function of rotor position.

$$dW(\text{elect}) = dW(\text{field}) + dW(\text{mech}) \qquad 1$$

$$Vi - Ri^2 = d(Li^2/2)dt + (i^2\overline{\omega}/2)dL/d\theta \qquad 2$$

$$T = (i^2/2)dL/d\theta \qquad 3$$

When the switched reluctance device is used in the electrical power generating mode of operation, equation 4 defines the mechanical energy output as being equal to the increase in energy stored in the coupling field plus the energy output to the electrical source (e.g. the battery). Equation 5 restates equation 4 in more specific terms and equation 6 defines the electrical power produced by the generator.

$$dW(\text{mech}) = dW(\text{field}) + dW(\text{elect}) \qquad 4$$

$$(i^2\overline{\omega}/2)dL/d\theta = d(Li^2/2)dt + Vi - Ri^2 \qquad 5$$

$$W = Vi \qquad 6$$

In equations 1–6 above, Vi and W represent electrical power, $Ri^2$ represents electrical power that is converted to heat, $d(Li^2/2)dt$ represents the differential energy that is absorbed by the coupling field, $(i^2\overline{\omega}/2)dL/d\theta$ represents the mechanical power (including losses), L is the motor inductance, θ is the rotor's angle of rotation, $\overline{\omega}$ is the angular velocity and T is the torque produced.

In outboard motors known to those skilled in the art, particularly those outboard motors that are larger in horsepower than can be started manually with a pull rope, a starter motor is used to initiate the operation of the internal combustion engine. In addition to the weight and cost of the starter motor itself, associated ground straps, pilot relays, sockets, harnesses, collars and brackets are required. In addition, several bolts are used to attach the starter motor to its preferred location under the cowl of the outboard motor. The starter motor and its associated components can weigh approximately 8 to 9 pounds.

An outboard motor known to those skilled in the art also requires some means to charge the battery that, in turn, is used to power the starter motor during the starting procedure. Typically, an alternator is provided along with a ground strap, anti rotation devices, a mounting bracket, and bolts. The weight of this alternator system is typically 8 to 9 pounds. Both the starter motor and alternator also require space under the cowl so that they can be positioned at a location near the internal combustion engine. In many types of outboard motors, the additional weight of the alternator and starter motor, along with the additional required space for these components, creates a significantly deleterious situation. In addition, the costs of these components can be significant.

The present invention provides a significant benefit by combining the functions of the starter motor and the alternator in a single switched reluctance device. In addition, the rotor of the switched reluctance device operates as a flywheel when attached directly to the crankshaft of the outboard motor. As a result, the additional weight of the flywheel can be eliminated. In some outboard motors, the total weight of the flywheel and ring gear can exceed 16 pounds. When the present invention is used, the switched reluctance device replaces the alternator system, the starter motor system, and the flywheel.

It should be clearly understood that the particular design of the switching circuit 30 and its associated control algorithm are not limiting to the present invention and can incorporate any one of numerous switching techniques and strategies that are applicable to achieve the various goals of any particular application. In other words, many different strategies and tactics have been developed and are known to those skilled in the art for achieving particular goals associated with a switch reluctance device. Those goals can include increased efficiency, quieter operation, or any other desired function. The present invention does not rely on any particular design or style of switching circuit or switching strategy.

The present invention has been described when the internal combustion engine is rotated, by the switched reluctance device used as a starter motor, to achieve the required rotational speed to allow the internal combustion engine to begin operation. It should be understood that the present invention can also be used, as a motor, to supplement the torque available from the internal combustion engine. Therefore, the switched reluctance device of the present invention can be operated as an electric motor at low engine speeds to start the internal combustion engine and at higher engine speeds to supplement the torque provided by the internal combustion engine. At other engine operating speeds, the switched reluctance device is operated as a generator to charge the batteries of the outboard motor.

Figure 14:
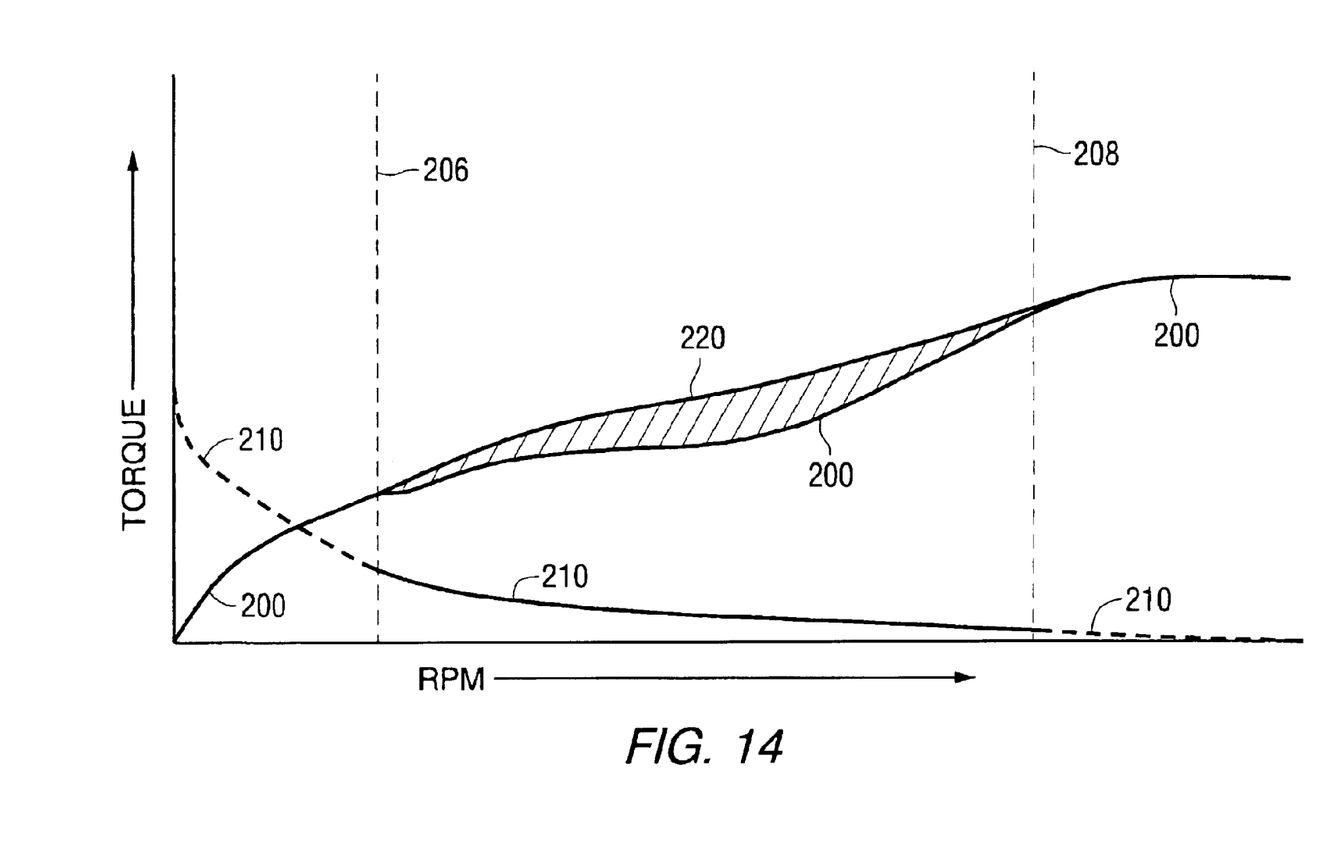
FIG. 14 is a graphical representation of the added torque advantage that is possible by using the present invention as a motor to supplement the internal combustion engine.

FIG. 14 is a graphical representation of several torque curves plotted as a function of engine operating speed. Line 200 represents the torque output of an internal combustion engine, particularly a direct fuel injected (DFI) engine used as the powerhead of an outboard motor. Two vertical dashed lines, 206 and 208, represent two engine operating speeds between which the torque output of the internal combustion engine is less than ideal. In a direct fuel injected engine, the operation of the engine occasionally experiences this torque output which is less than desired. As an example, above engine operating speeds of 1500 RPM, represented by dashed line 206, and below engine operating speeds of approximately 3000 RPM, represented by dashed line 208, an improvement in torque output by the internal combustion engine would be significantly beneficial. Line 210 in FIG. 14 represents the potential torque that can be provided by a switch reluctance device operating as an electric motor. If, in the engine operating range between dashed lines 206 and 208, the switch reluctance device is operated as a motor to assist the internal combustion engine in providing torque to the crankshaft, line 200 can be elevated to that represented by line 220. The cross hatch region between lines 200 and 220 between vertical dashed lines 206 and 208 represent the increase in torque in this engine operating range. Improved performance of the internal combustion engine is achieved if the switch reluctance device is used during this region of operation of the internal combustion engine.

The switch reluctance device of the present invention can operate either as a motor or a generator. A microprocessor, such as the engine control unit (ECU) can be used to activate the switch reluctance device in a motoring mode of operation or in an electrical power generating mode of operation. As described above, the difference between the motoring mode of operation and the generating mode of operation can be achieved by appropriately activating and deactivating the MOSFET's at the appropriate time to either energize the stator windings to generate torque and rotate the rotor or, alternatively, to energize the stator windings at appropriate times to allow the rotor to induce current flow through the stator windings. When used as a starter motor, the output of the switch reluctance device can provide sufficient torque to rotate the outboard motor engine up to approximately 400 RPM. This is generally sufficient to allow the internal combustion engine to start while the switch reluctance device also provides auxiliary power at engine speeds as low as approximately 400 RPM. After the engine has been started, the switch reluctance device can be switched back and forth between the electrical power generating mode and the motoring mode of operation to supply torque boost for acceleration, for supplying torque pulses at specific rotor angle positions for idle speed stabilization, or to supply added torque to prevent the internal combustion engine from stalling. During operation of the internal combustion engine at normal operating speeds, the switch reluctance device can also be operated in the motoring mode of operation to add torque to the output of the internal combustion engine as illustrated graphically in FIG. 14 and described above.

In a particular prototype embodiment of the present invention, the switch reluctance device used a separate crankshaft position sensor and microprocessor to control the switch reluctance device. The device was programmed to operate in the motoring mode of operation for up to 5 seconds, or until the internal combustion engine was operating at 400 RPM or greater, and then deactivate its motoring mode of operation. As the internal combustion engine increased its speed to a magnitude greater than 700 RPM, the engine control unit was programmed to assume that the engine was operating properly and then the switching circuit was changed to cause the switch reluctance motor to operate in an electrical power generating mode. This electrical power generating mode was deactivated at engine speeds below 400 RPM.

An alternative embodiment of the present invention implements the control of the switch reluctance device, by the engine control module that operates the engine, and utilize a single crankshaft position sensor that serves as both the crankshaft sensor and the rotor sensor. In addition, a single microprocessor operates to control the engine and the switch reluctance motor in that embodiment of the present invention.

In a preferred embodiment of the present invention, the engine control module is capable of briefly deactivating the electrical power generating mode of operation during certain periods of time, such as when the outboard motor is in an accelerating mode of operation. By deactivating the generating mode of operation momentarily, additional power is available to drive the crankshaft of the internal combustion engine. The motoring mode of operation can also be activated when additional torque is required. This method of operation has been described above in conjunction with FIG. 14. Improved engine response is available when the switch reluctance device is used in a motoring mode of operation to provide added torque to the torque provided by the internal combustion engine. In addition, the engine control module can briefly deactivate the electrical power generating mode of operation when the internal combustion engine is operating at idle speed. In addition, the motoring mode of operation can be periodically activated to provided torque pulses at certain angular positions of the crankshaft to enhance the quality of engine operation at idle speed.

With reference to FIGS. 1–14, a marine propulsion device made in accordance with the preferred embodiment of the present invention, comprises an internal combustion engine 12 and a crankshaft 14 supported within the internal combustion engine 12 for rotation about a generally vertical axis 18. A switched reluctance device 20 comprises a rotor 24 and a stator 26. The rotor 24 is attached in torque transmitting relation with the crankshaft 14 and is rotatable relative to the stator 26. A stator winding structure, 71–73, is associated with the stator 26 and, more particularly, with individual pole pairs 31 of the stator 26. A source of electrical power 54, such as a battery, is alternatively connectable in electrical communication with the stator winding, 71–73, in accordance with a motoring mode of operation (FIG. 12) and an electrical power generating mode of operation (FIG. 13). A switching circuit 50 is connected in signal communication with the stator winding, 71–73, and the source of electrical power 54 for connecting and disconnecting the stator winding 71–73 and the source of electric power 54 in coordination with rotation of the crankshaft 14 about the generally vertical axis 18. A controller 60 is connected in signal communication with the switching circuit 50 and configured to select the motoring mode of operation (FIG. 12) when the internal combustion engine 12 is being started and is selecting the electrical power generator mode of operation (FIG. 13) when the internal combustion engine is operating above a preselected operating speed.

The present invention can further comprise a position sensor 40 connected in signal communication with the switching circuit, in conjunction with the engine control module 60, for determining the rotational position of the rotor 24. The rotor 24 can be attached directly to the crankshaft 14 for rotation about the generally vertical axis 18. The rotor 24 can be disposed radially inward from the stator 26 (FIG. 2) or radially outward from the stator 26 (FIG. 3). The source of electric power 54 can be one or more batteries. Although the present invention can work in conjunction with a 12 volt DC supply, it has been determined that a preferable arrangement includes a 36 volt DC supply. A 36 volt DC supply allows several of the components associated with the present invention to be reduced in size because of the resulting reduction in current when a 36 volt DC supply is used. When a 36 volt DC supply is used, the wire size in the stator 26 can be significantly reduced. This use of a smaller wire size in the stator 26 further reduces the overall size and weight of the machine. The present invention has been described in conjunction with a stator 26 that comprises 18 poles 31 and a rotor 24 that comprises 12 poles 30. The rotor 24 serves as a flywheel for the internal combustion engine 12. The switching circuit 50 comprises a plurality of metal oxide semiconductor field effect transistors (MOSFET's), 81–83 and 91–93.

The basic concept of the present invention is to utilize a switched reluctance device in conjunction with a crankshaft of an internal combustion engine of an outboard motor. The rotor 24 of the switched reluctance device 20 is supported for rotation about a generally vertical axis and serves as a flywheel for the internal combustion engine 12. By serving as a starter motor, an electrical generator, and a flywheel, the switched reluctance device of the present invention significantly reduces the weight of the outboard motor and the space necessary to house the components to provide these three separate functions.

Although the present invention has been described in particular detail and illustrated to show a preferred embodiment, it should be understood that alternative embodiments are also within its scope.

We claim:
1. A marine propulsion device, comprising:
an internal combustion engine;
a crankshaft supported within said internal combustion engine for rotation about a generally vertical axis;
a switched reluctance device comprising a rotor and a stator, said rotor being attached in torque transmitting relation with said crankshaft, said rotor being rotatable relative to said stator;
a stator winding structure associated with said stator;
a source of electrical power which is alternatively connectable in electrical communication with said stator winding in accordance with a motoring mode of operation and an electrical power generating mode of operation;
a switching circuit connected in signal communication with said stator winding and said source of electrical power for connecting and disconnecting said stator winding and said source of electrical power in coordination with rotation of said crankshaft about said generally vertical axis; and
a controller connected in signal communication with said switching circuit and configured to select said motoring mode of operation when said internal combustion engine is being started and to select said electrical power generating mode of operation when said internal combustion engine is operating above a preselected operating speed.
2. The marine propulsion device of claim 1, further comprising:
a position sensor, connected in signal communication with said controller, for determining the rotational position of said rotor.
3. The marine propulsion device of claim 1, wherein:
said rotor is attached directly to said crankshaft.
4. The marine propulsion device of claim 1, wherein:
said rotor is rotatable about said vertical axis.
5. The marine propulsion device of claim 1, wherein:
said rotor is disposed radially inward from said stator.
6. The marine propulsion device of claim 1, wherein:
said source of electrical power is a thirty-six volt battery system.
7. The marine propulsion device of claim 1, wherein:
said stator has eighteen poles and said rotor has twelve poles.
8. The marine propulsion device of claim 1, wherein:
said rotor is a flywheel of said internal combustion engine.
9. The marine propulsion device of claim 1, wherein:
said switching circuit comprises a plurality of metal oxide semiconductor field effect transistors.
10. A marine propulsion device, comprising:
an internal combustion engine;
a crankshaft supported within said internal combustion engine for rotation about a generally vertical axis;
a switched reluctance device comprising a rotor and a stator, said rotor being attached to said crankshaft, said rotor being rotatable relative to said stator;
a stator winding structure associated with said stator;
a source of electrical power which is alternatively connectable in electrical communication with said stator winding in accordance with a motoring mode of operation and an electrical power generating mode of operation;
a switching circuit connected in signal communication with said stator winding and said source of electrical power for connecting and disconnecting said stator winding and said source of electrical power in coordi- nation with rotation of said crankshaft about said generally vertical axis;

a controller connected in signal communication with said switching circuit and configured to select said motoring mode of operation when said internal combustion engine is being started and to select said electrical power generating mode of operation when said internal combustion engine is operating above a preselected operating speed; and a position sensor, connected in signal communication with said switching circuit, for determining the rotational position of said rotor.

11. The marine propulsion device of claim 10, wherein:
said rotor is rotatable about said vertical axis.

12. The marine propulsion device of claim 11, wherein:
said source of electrical power comprises a battery system for providing thirty-six volt DC power.

13. The marine propulsion device of claim 11, wherein:
said rotor is disposed radially outward from said stator.

14. The marine propulsion device of claim 12, wherein:
said stator has eighteen poles and said rotor has twelve poles.

15. The marine propulsion device of claim 11, wherein:
said rotor is a flywheel of said internal combustion engine.

16. The marine propulsion device of claim 11, wherein:
said switching circuit comprises a plurality of metal oxide semiconductor field effect transistors.

17. A method for operating a marine propulsion device, comprising the steps of:

providing an internal combustion engine;

supporting a crankshaft within said internal combustion engine for rotation about a generally vertical axis;

attaching a switched reluctance device in torque transmitting relation with said crankshaft, said switched reluctance device comprising a rotor and a stator, said rotor being rotatable relative to said stator;

providing a stator winding structure associated with said stator;

providing a source of electrical power which is alternatively connectable in electrical communication with said stator winding in accordance with a motoring mode of operation and an electrical power generating mode of operation;

connecting a switching circuit in signal communication with said stator winding and said source of electrical power;

sequentially connecting and disconnecting said stator winding and said source of electrical power in coordination with rotation of said crankshaft about said generally vertical axis; and providing a controller connected in signal communication with said switching circuit, said controller being configured to select said motoring mode of operation when said internal combustion engine is being started and to select said electrical power generating mode of operation when said internal combustion engine is operating above a preselected operating speed.

18. The marine propulsion device of claim 17, further comprising:

selecting said motoring mode of operation when said internal combustion engine is operating above said preselected operating speed to combine the torque output of said internal combustion engine with the torque output of said switched reluctance device.

19. The marine propulsion device of claim 18, wherein:
said motoring mode of operation is selected between a first engine operating speed and a second engine operating speed.

20. The marine propulsion device of claim 19, wherein:
said first engine operating speed is approximately 1,500 RPM and said second engine operating speed is approximately 3,000 RPM.

\* \* \* \* \*